US012463365B2

(12) United States Patent
Ho et al.

(10) Patent No.: US 12,463,365 B2
(45) Date of Patent: Nov. 4, 2025

(54) RECEPTACLE HAVING A CONDUCTIVE SEAT FOR COUPLING TO A CIRCUIT BOARD

(71) Applicant: Molex, LLC, Lisle, IL (US)

(72) Inventors: Yi-Tse Ho, New Taipei (TW); Chiuming Lu, Lisle, IL (US)

(73) Assignee: Molex, LLC, Lisle, IL (US)

( * ) Notice: Subject to any disclaimer, the term of this patent is extended or adjusted under 35 U.S.C. 154(b) by 895 days.

(21) Appl. No.: 17/703,985

(22) Filed: Mar. 25, 2022

(65) Prior Publication Data

US 2022/0336984 A1 Oct. 20, 2022

(30) Foreign Application Priority Data

Apr. 19, 2021 (CN) ........................ 202120801575.9

(51) Int. Cl.

*H01R 13/187* (2006.01)
*H01R 12/71* (2011.01)
*H01R 12/91* (2011.01)
*H01R 13/11* (2006.01)
*H01R 12/70* (2011.01)

(52) U.S. Cl.

CPC ........... *H01R 12/91* (2013.01); *H01R 12/716* (2013.01); *H01R 13/111* (2013.01); *H01R 12/707* (2013.01)

(58) Field of Classification Search

CPC .... H01R 12/91; H01R 12/716; H01R 13/111; H01R 12/707; H01R 12/7088; H01R 13/187

See application file for complete search history.

(56) References Cited

U.S. PATENT DOCUMENTS

| | | | | | |
|---|---|---|---|---|---|
| 4,714,441 | A * | 12/1987 | Corman | H01R 13/187 | 439/842 |
| 7,845,963 | B2 * | 12/2010 | Gastineau | H01R 13/639 | 439/321 |
| 8,636,522 | B2 * | 1/2014 | Sykes | H01R 9/0515 | 439/63 |
| 8,888,537 | B2 * | 11/2014 | Do | H01R 13/5202 | 439/668 |
| 9,099,797 | B1 * | 8/2015 | Duesterhoeft | H01R 4/58 | |
| 9,742,081 | B1 * | 8/2017 | Annis | H01R 12/7082 | |
| 10,050,367 | B1 * | 8/2018 | Frank | H01R 12/78 | |
| 10,153,597 | B1 * | 12/2018 | Polinski | H01R 24/58 | |
| D877,702 | S | 3/2020 | Joniak et al. | | |

(Continued)

FOREIGN PATENT DOCUMENTS

| | | |
|---|---|---|
| CN | 109923737 A | 6/2019 |
| CN | 209516176 U | 10/2019 |

*Primary Examiner* — Abdullah A Riyami
*Assistant Examiner* — Nelson R. Burgos-Guntin

(57) ABSTRACT

A receptacle includes a conductive seat and a contact unit. The conductive seat has a body portion and two supporting portions, the body portion has a front end, a rear end and two side ends, the body portion is formed with a passageway which is positioned between the front end and the rear end, the two supporting portions integrally extend outwardly from the two side ends respectively, each supporting portion has a mounting surface which is positioned at a bottom portion of the supporting portion and a plurality of connecting legs which extend downwardly from the mounting surface. The contact unit is provided in the passageway of the body portion.

20 Claims, 11 Drawing Sheets

(56) References Cited

U.S. PATENT DOCUMENTS

| | | | | |
|---|---|---|---|---|
| D880,428 | S | 4/2020 | Pietschmann | |
| 2015/0147911 | A1* | 5/2015 | Logan, Jr. | H01R 12/91<br>29/842 |
| 2018/0366854 | A1* | 12/2018 | Kobayashi | H01R 12/58 |
| 2019/0267735 | A1* | 8/2019 | Lu | H01R 25/162 |

* cited by examiner

100

RECEPTACLE HAVING A CONDUCTIVE SEAT FOR COUPLING TO A CIRCUIT BOARD

RELATED APPLICATIONS

The present application claims priority to Chinese Patent Application No. 202120801575.9 filed on Apr. 19, 2021 which is incorporated by reference in its entirety.

TECHNICAL FIELD

The present disclosure relates to a receptacle, and particularly relates to a receptacle having a conductive seat.

BACKGROUND ART

Chinese disclosure patent application publication No. CN109923737A discloses a receptacle connector, the receptacle connector is provided to be mounted to an element (such as a printed circuit board). The receptacle connector includes a base, a barrel member, at least one biasing member and a contacting member. The base has a passageway and a channel extending outwardly from the passageway. The barrel member includes a wall, the wall has a flange extending outwardly therefrom, and the flange surrounds the wall. The contacting member is seated in the barrel member, the wall is seated in the passageway and the flange is seated in the channel, the at least one biasing member is seated in the channel and is clamped between the flange and the channel.

Chinese utility model patent application issuance publication No. CN209516176U discloses a float-type receptacle, and the float-type receptacle includes a conductive seat and at least two contact units. The conductive seat has a passageway which is formed along a mating direction, at least two annular receiving grooves are sequentially constructed along the mating direction and extend outwardly from the passageway. The at least two contact units are provided to be sequentially arranged along the passageway, each contact unit includes a barrel-shaped member, a biasing member and a cage-shaped contacting member. The barrel-shaped member has a barrel body and an annular flange which extends outwardly from the barrel body, the annular flange is received in the corresponding annular receiving groove, the biasing member has elasticity and is provided between the annular flange of the barrel-shaped member and the annular receiving groove, so as to allow that the barrel-shaped member of the contact unit can float in the passageway. The cage-shaped contacting member is provided in the barrel body of the barrel-shaped member.

The above two prior arts are mainly directed to improve the mating elements (the barrel, the at least one biasing member, the contacting member and the contact unit), but the above two prior arts does not optimize and improve the conductive seat (the base).

SUMMARY

Therefore, an object of the present disclosure is to provide a receptacle which optimizes and improves a conductive seat.

Accordingly, in some embodiments, a receptacle of the present disclosure comprises a conductive seat and a contact unit. The conductive seat has a body portion and two supporting portions, the body portion has a front end, a rear end and two side ends, the body portion is formed with a passageway which is positioned between the front end and the rear end, the two supporting portions integrally extend outwardly from the two side ends respectively, each supporting portion has a mounting surface which is positioned at a bottom portion of the supporting portion and a plurality of connecting legs which extend downwardly from the mounting surface. The contact unit is provided in the passageway of the body portion.

In some embodiments, the two supporting portions extend rearwardly beyond the rear end of the body portion.

In some embodiments, the body portion further has a top end and a bottom end, the body portion further is formed with a ventilating duct which is positioned between the top end and the bottom end and is communicated with the passageway.

In some embodiments, the body portion further has a bottom end, the two mounting surfaces of the two supporting portions are higher than the bottom end of the body portion.

In some embodiments, the conductive seat further is formed with an annular receiving groove which extends outwardly from the passageway, the contact unit comprises a barrel-shaped member, a biasing member and a cage-shaped contacting member, the barrel-shaped member has a barrel body whose outer diameter is less than the passageway and an annular flange which extends outwardly from an outer wall surface of the barrel body, the annular flange is movably received in the annular receiving groove, the biasing member has elasticity and is provided between the annular flange of the barrel-shaped member and the annular receiving groove to allow the barrel-shaped member of the contact unit can float in the passageway, and the cage-shaped contacting member is provided in the barrel body of the barrel-shaped member.

In some embodiments, the conductive seat comprises at least two seat bodies which are combined with each other, one seat body of the at least two seat bodies is formed with an annular recessed portion, the annular receiving groove is defined together by the annular recessed portion of the one seat body and another seat body of the at least two seat bodies.

In some embodiments, the contact unit further comprises a fixing ring, the fixing ring and the barrel body of the barrel-shaped member together clamp the cage-shaped contacting member so as to fix the cage-shaped contacting member in the barrel-shaped member.

In some embodiments, each supporting portion further has a raising portion which extends downwardly from the mounting surface.

In some embodiments, the plurality of connecting legs are connected to the mounting surface at an outer side of the mounting surface relative to the raising portion, the raising portion is connected to the mounting surface at an inner side of the mounting surface relative to the plurality of connecting legs.

In some embodiments, the raising portion is a rib which extends forwardly and rearwardly.

In some embodiments, the receptacle is adapted to be provided to a circuit board, the circuit board has an opening and two conductive pads and a plurality of conductive holes which are respectively positioned at two sides of the opening, each conductive hole is at least partially overlapped with the corresponding conductive pad, the connecting legs of the receptacle are electrically connected and inserted into the plurality of conductive holes respectively, the two mounting surfaces of the two supporting portions are respectively surface bonded and soldered to the two conductive pads of the circuit board by a solder, and the body portion of the conductive seat of the receptacle is received in the opening.

In some embodiments, each supporting portion further has a raising portion which extends downwardly from the mounting surface, and the raising portion makes a gap remained between the mounting surface of the supporting portion and the conductive pad of the circuit board.

In the present disclosure, the conductive seat is provided to the circuit board via the two supporting portions which each are positioned at the outer side of the corresponding mounting surface, the capability of the conductive seat resisting to a torque generated by a force in the left-right direction subjected by the conductive seat can be strengthened, therefore the assembled strength between the conductive seat and the circuit board can be strengthened.

BRIEF DESCRIPTION OF THE DRAWINGS

Other features and technical effects of the present disclosure will be apparent in an embodiment referring to the accompanying figures, in which.

DETAILED DESCRIPTION OF THE PREFERRED EMBODIMENT

Figure 1:
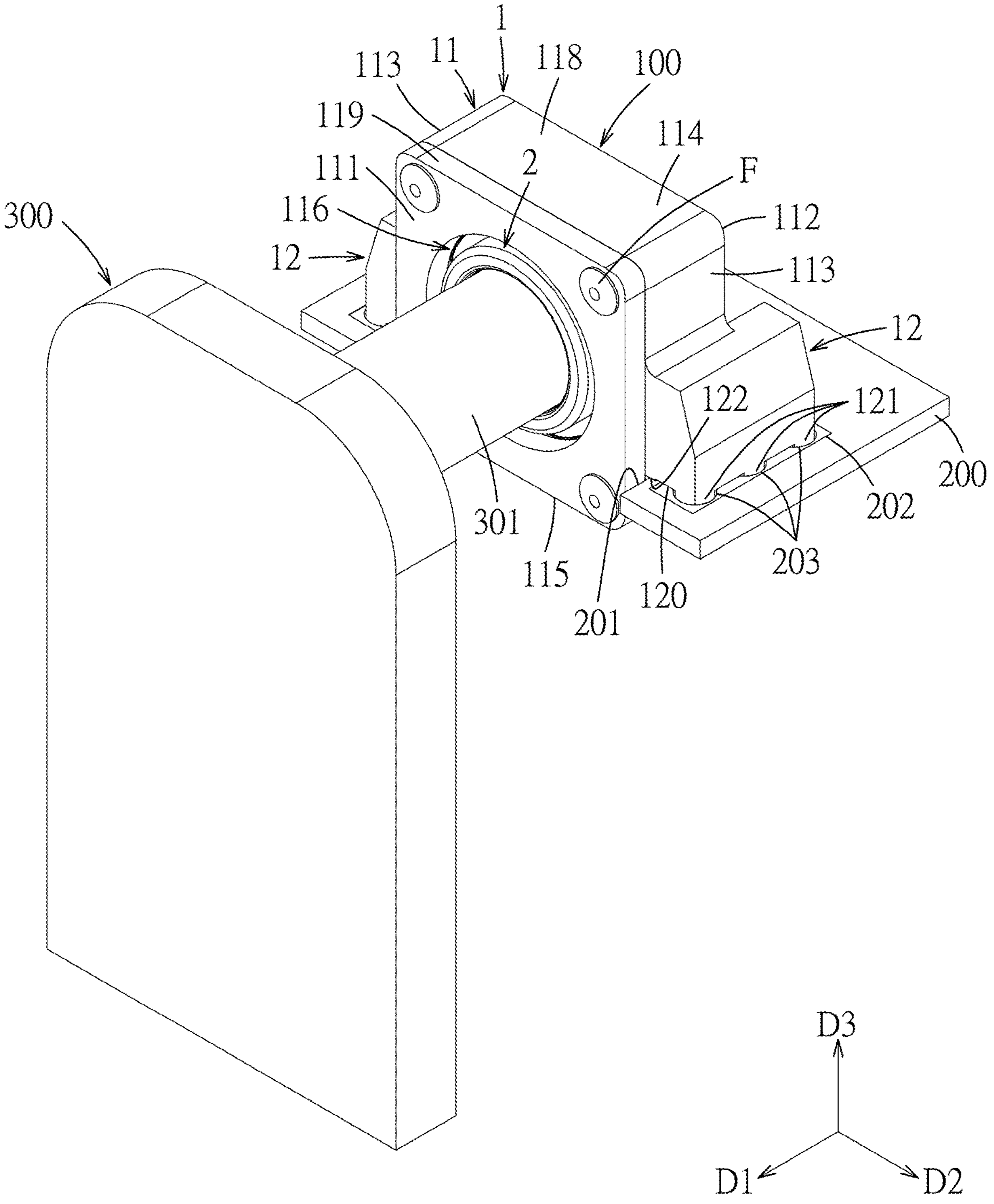
FIG. 1 is a perspective view of a receptacle of a first embodiment of the present disclosure provided to a circuit board and mated with a plug.
Figure 2:
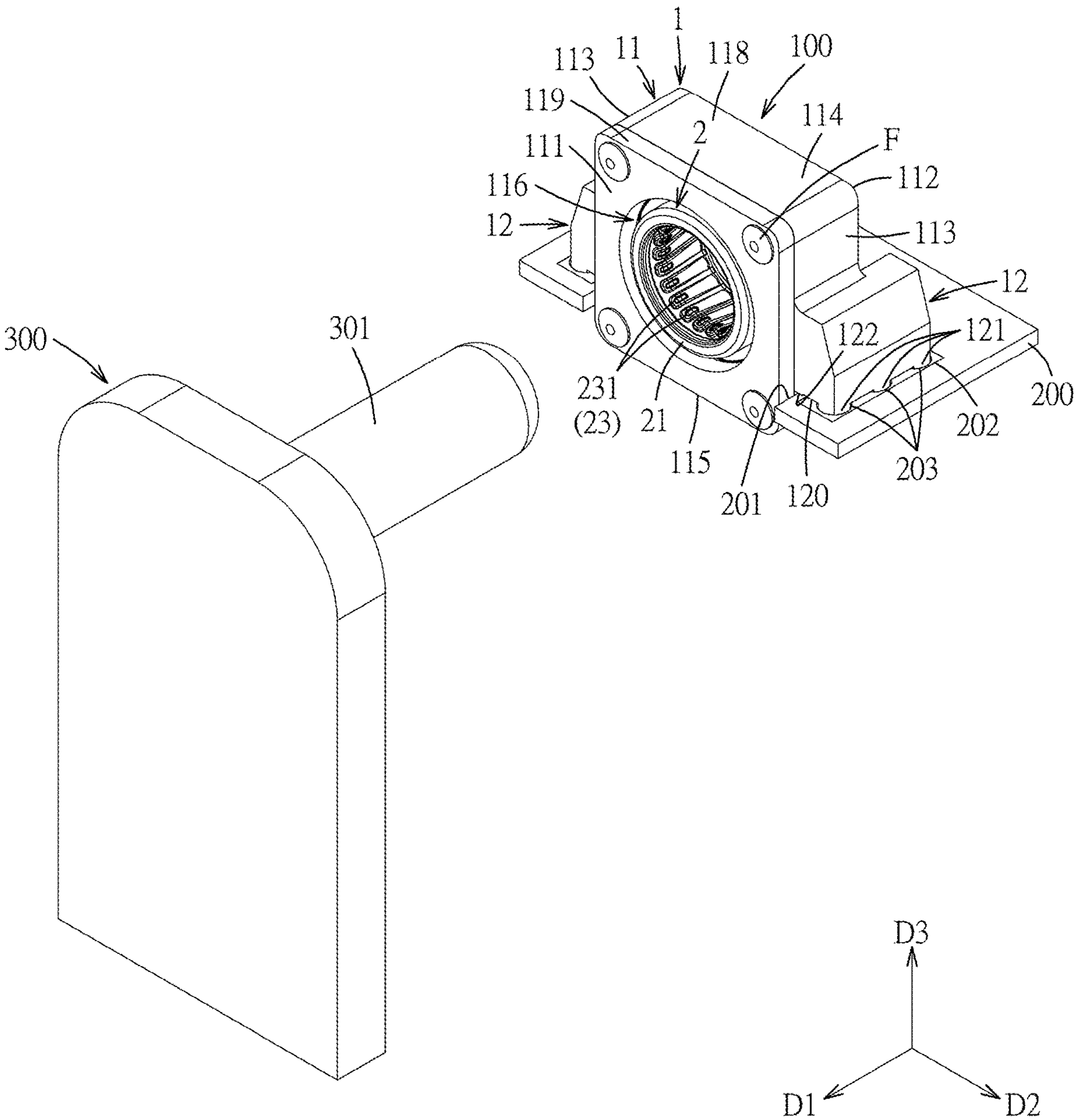
FIG. 2 is a perspective exploded view of FIG. 1.
Figure 3:
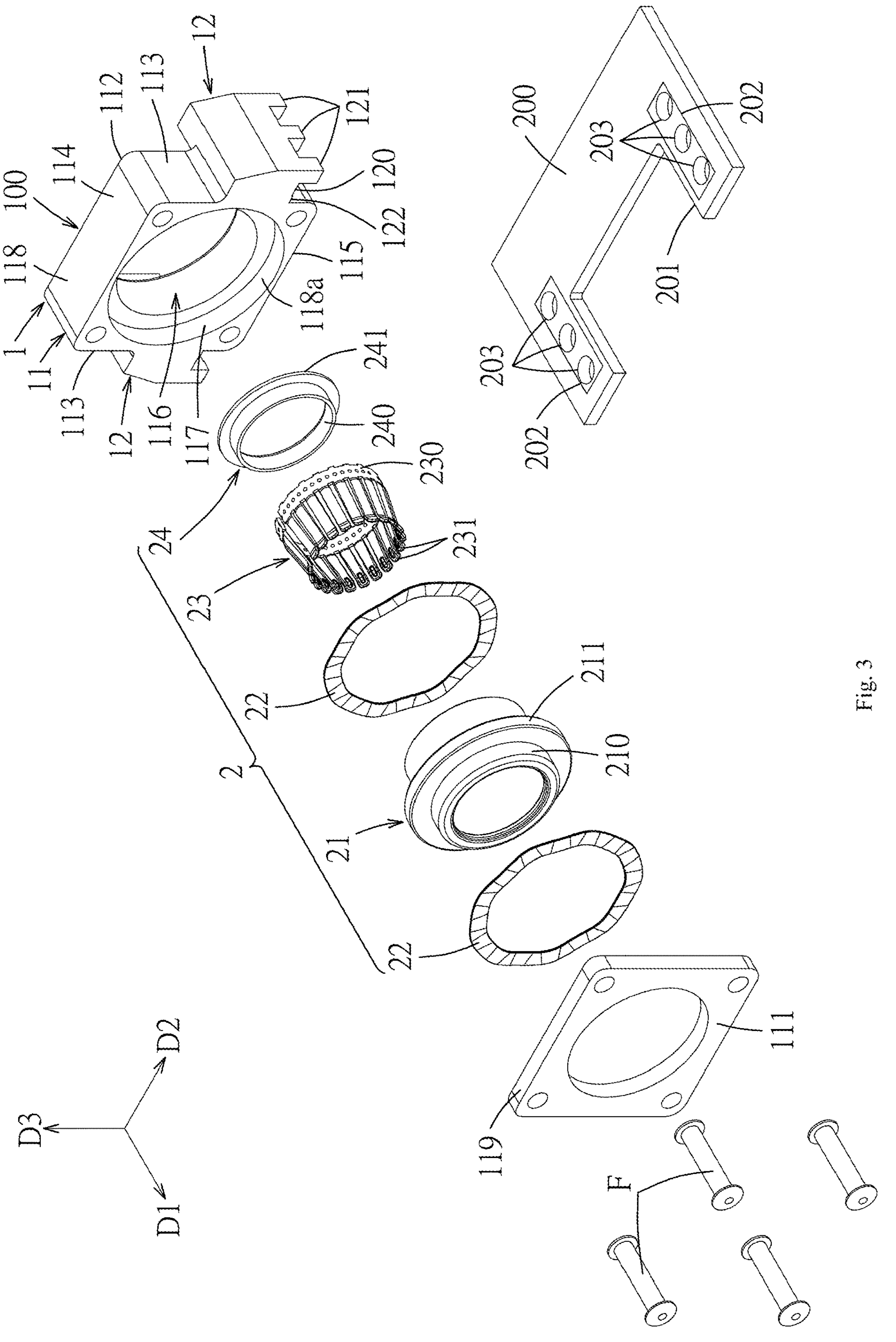
FIG. 3 is a perspective exploded view of the first embodiment and the circuit board.

Before the present disclosure is described in detail, it is noted that like elements are represented by the same reference numerals in the following description.

Referring to FIG. 1 to FIG. 4, a first embodiment of a receptacle 100 of the present disclosure is adapted to be provided to a circuit board 200 and is adapted to mate with an insertion pin 301 of a plug 300. The receptacle 100 includes a conductive seat 1 and a contact unit 2.

The conductive seat 1 has a body portion 11 and two supporting portions 12. The body portion 11 has a front end 111 and a rear end 112 which are respectively positioned in a front direction and a rear direction along a front-rear direction D1 (a direction pointed by an arrow of D1 is front and a direction opposite thereto is rear), two side ends 113 which are respectively positioned in a left direction and a right direction along a left-right direction D2 (a direction pointed by an arrow of D2 is right, and a direction opposite thereto is left), and a top end 114 and a bottom end 115 which are respectively positioned in an up direction and a down direction along an up-down direction D3 (a direction pointed by an arrow of D3 is up, and a direction opposite thereto is down). The body portion 11 is penetratingly formed with a passageway 116 which is positioned between the front end 111 and the rear end 112 and allows the insertion pin 301 of the plug 300 to insert therein. The two supporting portions 12 integrally extend outwardly from the two side ends 113 respectively, and the two supporting portions 12 extend rearwardly beyond the rear end 112 of the body portion 11. Each supporting portion 12 has a mounting surface 120 which is positioned at a bottom portion of the supporting portion 12, a plurality of connecting legs 121 which extend downwardly from the mounting surface 120 and a raising portion 122 which extends downwardly from the mounting surface 120, the two supporting portions 12 of the two mounting surfaces 120 are higher than the bottom end 115 of the body portion 11. Here, the plurality of connecting legs 121 are connected to the mounting surface 120 at an outer side of the mounting surface 120 relative to the raising portion 122 and are arranged side-by-side along the front-rear direction D1, the raising portion 122 is connected to the mounting surface 120 at an inner side of the mounting surface 120 relative to the plurality of connecting legs 121, and the raising portion 122 is a rib which extends forwardly and rearwardly along the front-rear direction D1.

The circuit board 200 has an opening 201 which is positioned at a front edge of the circuit board 200 and two conductive pads 202 and a plurality of conductive holes 203 which are respectively positioned at a left side and a right side of the opening 201, the opening 201 in the first embodiment is a notch shape, but the present disclosure is not limited thereto. Each conductive hole 203 is overlapped with the corresponding conductive pad 202, but it is noted that, in other varied implementing manners, the conductive hole 203 also may be only at least partially overlapped with the corresponding conductive pad 202. These connecting legs 121 of the receptacle 100 are electrically connected to and inserted into these conductive holes 203 respectively, the two mounting surfaces 120 of the two supporting portions 12 are surface bonded to, electrically connected to and soldered to the two conductive pads 202 of the circuit board 200 by a solder, the raising portion 122 makes a gap remained between the mounting surface 120 of the supporting portion 12 and the conductive pad 202 of the circuit board 200 during soldering, which may allow more solder can enter into the gap, in turn promote the soldering strength between the supporting portion 12 and the circuit board 200. In addition, because the two mounting surfaces 120 of the two supporting portions 12 are higher than the bottom end 115 of the body portion 11 and the body portion 11 of the conductive seat 1 of the receptacle 100 is received in the opening 201, a height of the conductive seat 1 relative to the circuit board 200 can be lowered, in turn a whole height of the receptacle 100 and the circuit board 200 which are assembled is lowered.

Moreover, because the conductive seat 1 is provided to the circuit board 200 via the two supporting portions 12 which each are positioned at the outer side of the corresponding mounting surface 120, the capability of the conductive seat 1 resisting to a torque generated by a force in the left-right direction subjected by the conductive seat 1 can be strengthened, therefore the assembled strength between the conductive seat 1 and the circuit board 200 can be strengthened. Also, because these connecting legs 121 are connected to the mounting surfaces 120 of the two supporting portions 12 at the outer sides of the mounting surfaces 120 respectively, the capability of the conductive seat 1 resisting to a torque generated by a force in the left-right direction subjected by the conductive seat 1 can also be further strengthened. Furthermore, the two supporting portions 12 extend rearwardly beyond the rear end 112 of the body portion 11, not only a conductive contact area between the conductive seat 1 and the circuit board 200 can be enlarged, but also the capability of the conductive seat 1 resisting to a torque generated by a force in the front-rear direction subjected by the conductive seat 1 can be strengthened, which prevents the conductive seat 1 from being loosened when the insertion pin 301 of the plug 300 is inserted into or pulled out from the conductive seat 1 and further strengthens the assembled strength between the conductive seat 1 and the circuit board 200.

Referring to FIG. 2 to FIG. 6, the contact unit 2 is provided in the passageway 116 of the body portion 11 of the conductive seat 1. The conductive seat 1 is further formed with an annular receiving groove 117 which extends outwardly from the passageway 116. Specifically, in the first embodiment, the conductive seat 1 includes a rear seat body 118 and a front seat body 119 which are combined with each other by a plurality of fixing members F. For example, The fixing member F may be a rivet, but the present disclosure is not limited thereto. Here, the rear seat body 118 is formed with an annular recessed portion 118*a*, the annular receiving groove 117 is defined together by the annular recessed portion 118*a* of the rear seat body 118 and the front seat body 119. The contact unit 2 includes a barrel-shaped member 21, two biasing members 22, a cage-shaped contacting member 23 and a fixing ring 24. The barrel-shaped member 21 has a barrel body 210 whose an outer diameter is less than the passageway 116 and an annular flange 211 which extends outwardly from an outer wall surface of the barrel body 210, the annular flange 211 is movably received in the annular receiving groove 117, the two biasing members 22 have elasticity and are provided between the annular flange 211 of the barrel-shaped member 21 and the annular receiving groove 117, so as to allow that the barrel-shaped member 21 of the contact unit 2 can float in the passageway 116. Specifically, in the first embodiment, the two biasing members 22 are wave spring annular plates and are respectively provided to two end faces of the annular flange 211 in the front-rear direction D1, but in other implementing manners, the two biasing members 22 may be other existing elastic elements which can be used to apply a pressure, and the biasing member 22 may be one or three or more in number, thus is not limited to the first embodiment.

The cage-shaped contacting member 23 is provided in the barrel body 210 of the barrel-shaped member 21 and allows the insertion pin 301 of the plug 300 to pass therethrough. The cage-shaped contacting member 23 has an annular head portion 230 which is provided to an inner wall surface of the barrel body 210 and is adjacent to a rear edge of the barrel body 210 and a plurality of elastic contacting pieces 231 which extend inwardly and obliquely from the annular head portion 230 toward a front edge of the barrel body 210 and are used to contact the insertion pin 301. The fixing ring 24 and the barrel body 210 of the barrel-shaped member 21 together clamp the annular head portion 230 of the cage-shaped contacting member 23 to fix the cage-shaped contacting member 23 in the barrel-shaped member 21. Specifically, the fixing ring 24 has a clamping portion 240 which is annular and clamps the annular head portion 230 of the cage-shaped contacting member 23 together with the inner wall surface of the barrel body 210 and an abutting portion 241 which extends outwardly from an end edge of the clamping portion 240 and abuts against the rear edge of the barrel body 210.

Figure 7:
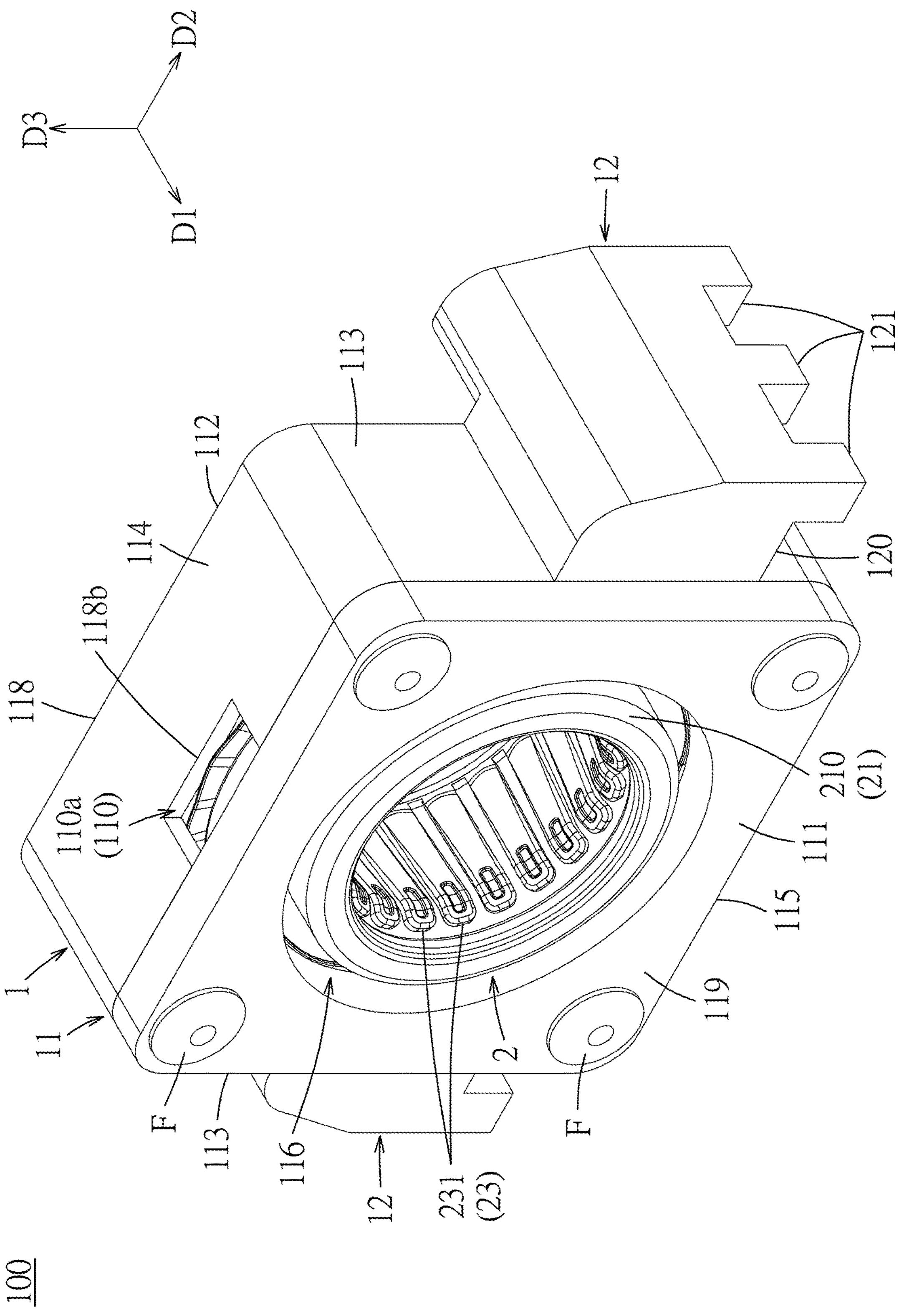
FIG. 7 is a perspective view of a second embodiment of the receptacle of the present disclosure.
Figure 8:
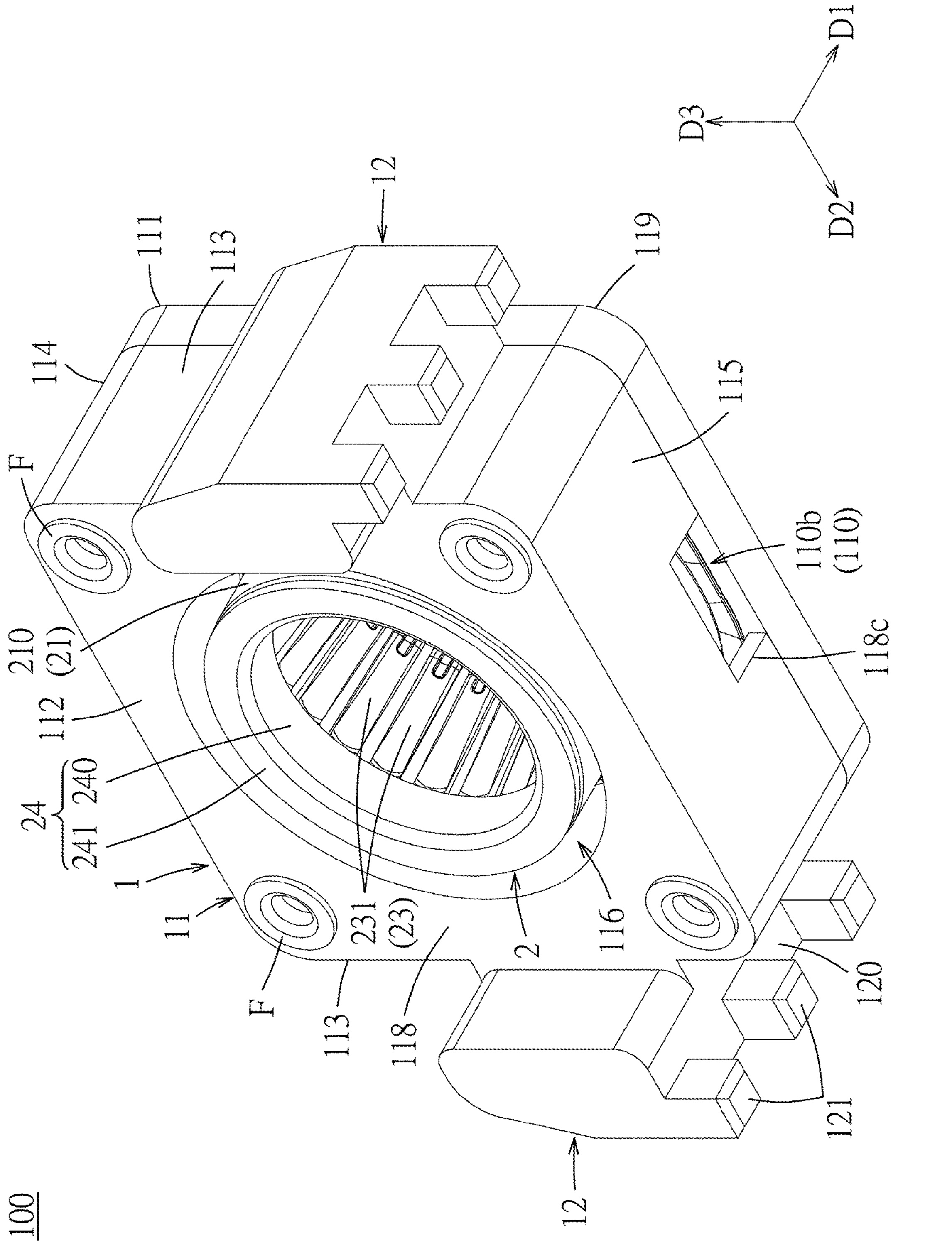
FIG. 8 is a perspective view of the second embodiment of FIG. 7 viewed from another angle.
Figure 9:
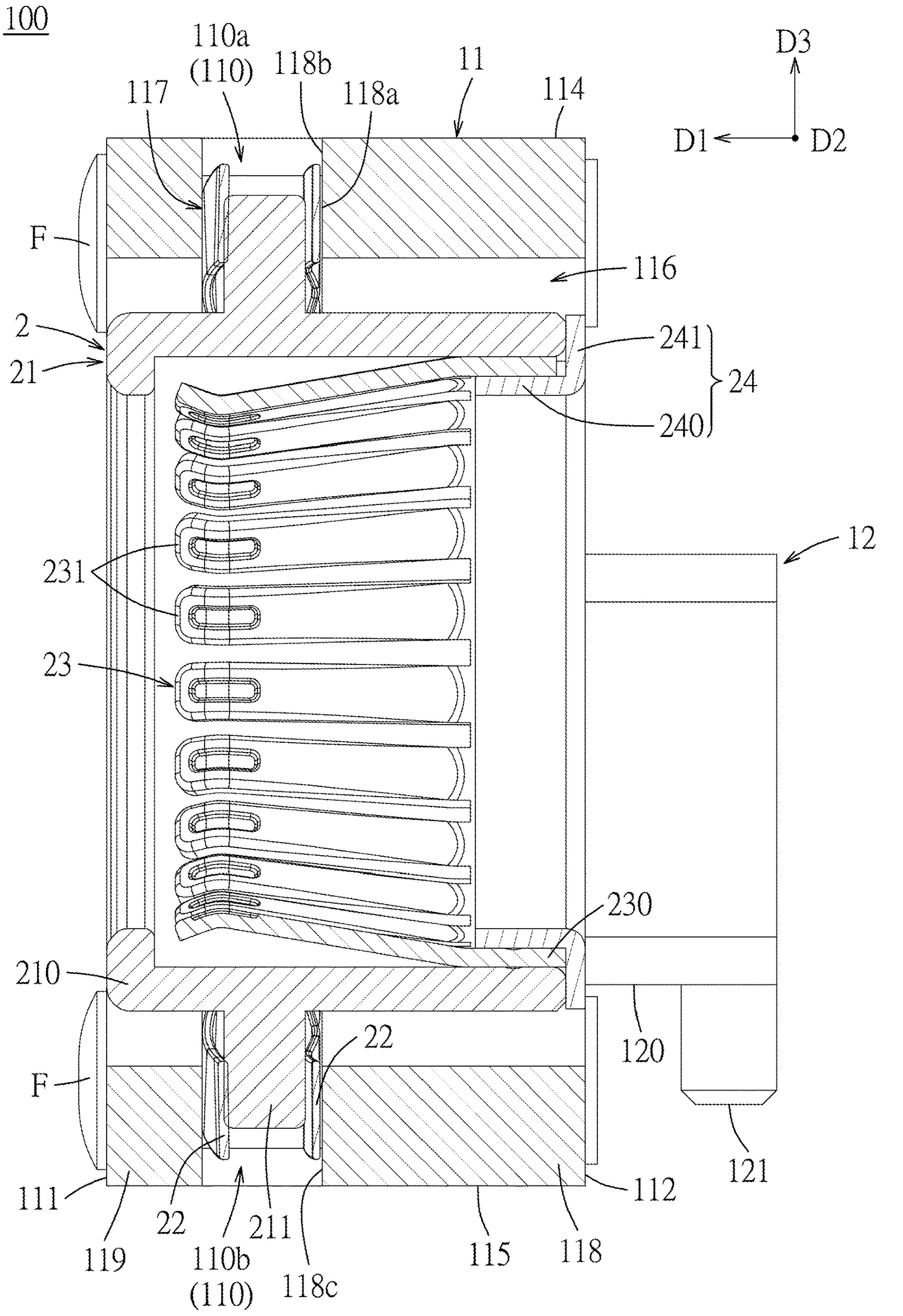
FIG. 9 is a cross sectional view of the second embodiment.

Referring to FIG. 7 to FIG. 9, a second embodiment of the present disclosure receptacle 100 differs from the first embodiment in that, the body portion 11 of the conductive seat 1 further is formed with a ventilating duct 110 which is positioned between the top end 114 and the bottom end 115 and is communicated with the passageway 116. Specifically, the ventilating duct 110 has a top port 110*a* which is formed to the top end 114 and is communicated with a top portion of the annular receiving groove 117 and a bottom port 110*b* which is formed to the bottom end 115 and is communicated with a bottom portion of the annular receiving groove 117, the ventilating duct 110 is communicated with the passageway 116 via the annular receiving groove 117, the top port 110*a* is defined together by a top recessed portion 118*b* of the rear seat body 118 and the front seat body 119, the bottom port 110*b* is defined together by a bottom recessed portion 118*c* of the rear seat body 118 and the front seat body 119. The ventilating duct 110 can make an air flow more easily flow through the passageway 116 so as to strengthen heat dissipating effect on the conductive seat 1 and the contact unit 2. In addition, the two mounting surfaces 120 of the two supporting portions 12 each are not provided with the raising portion 122 as shown in FIG. 4.

Figure 4:
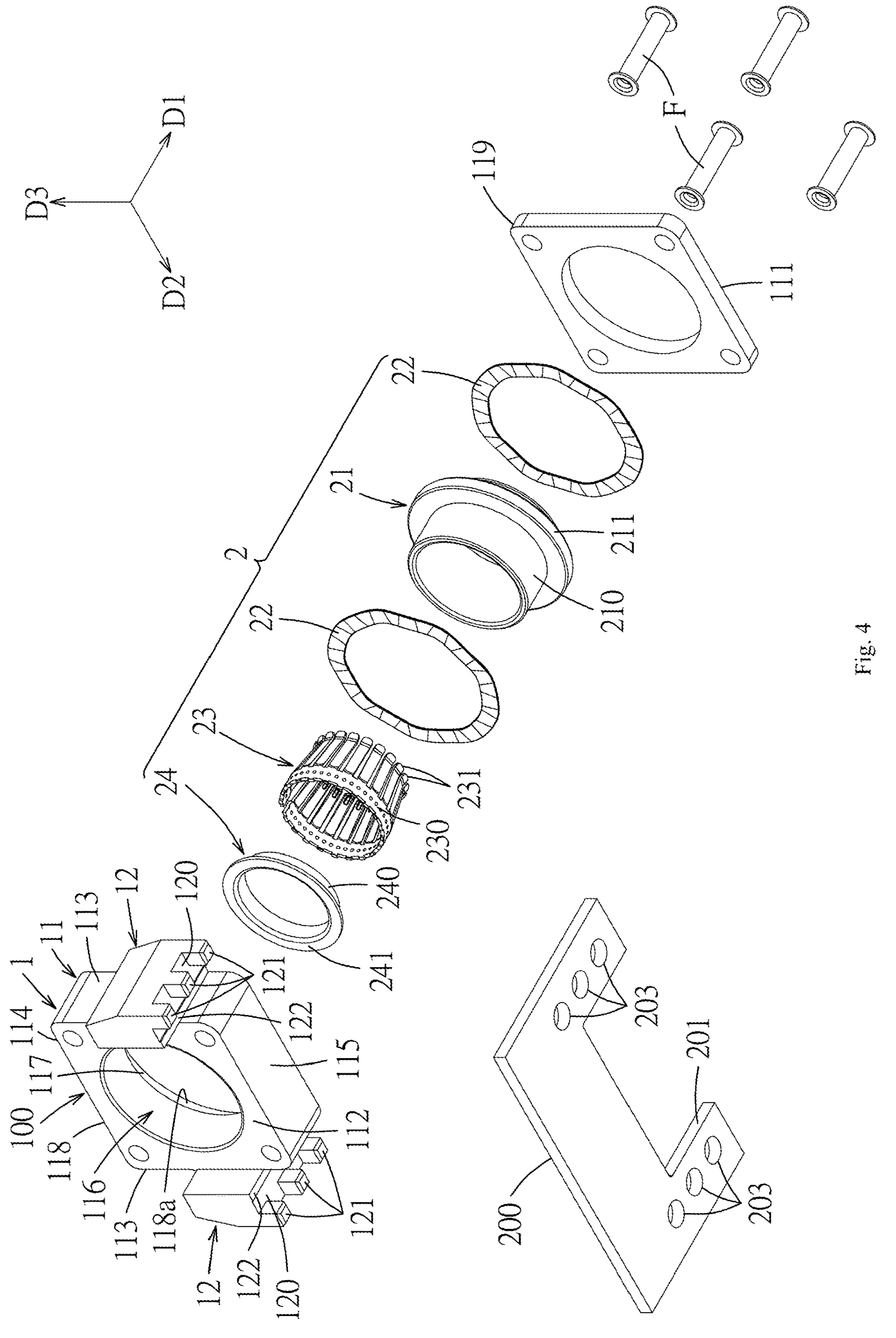
FIG. 4 is a perspective exploded view of the first embodiment and the circuit board of FIG. 3 viewed from another angle.
Figure 5:
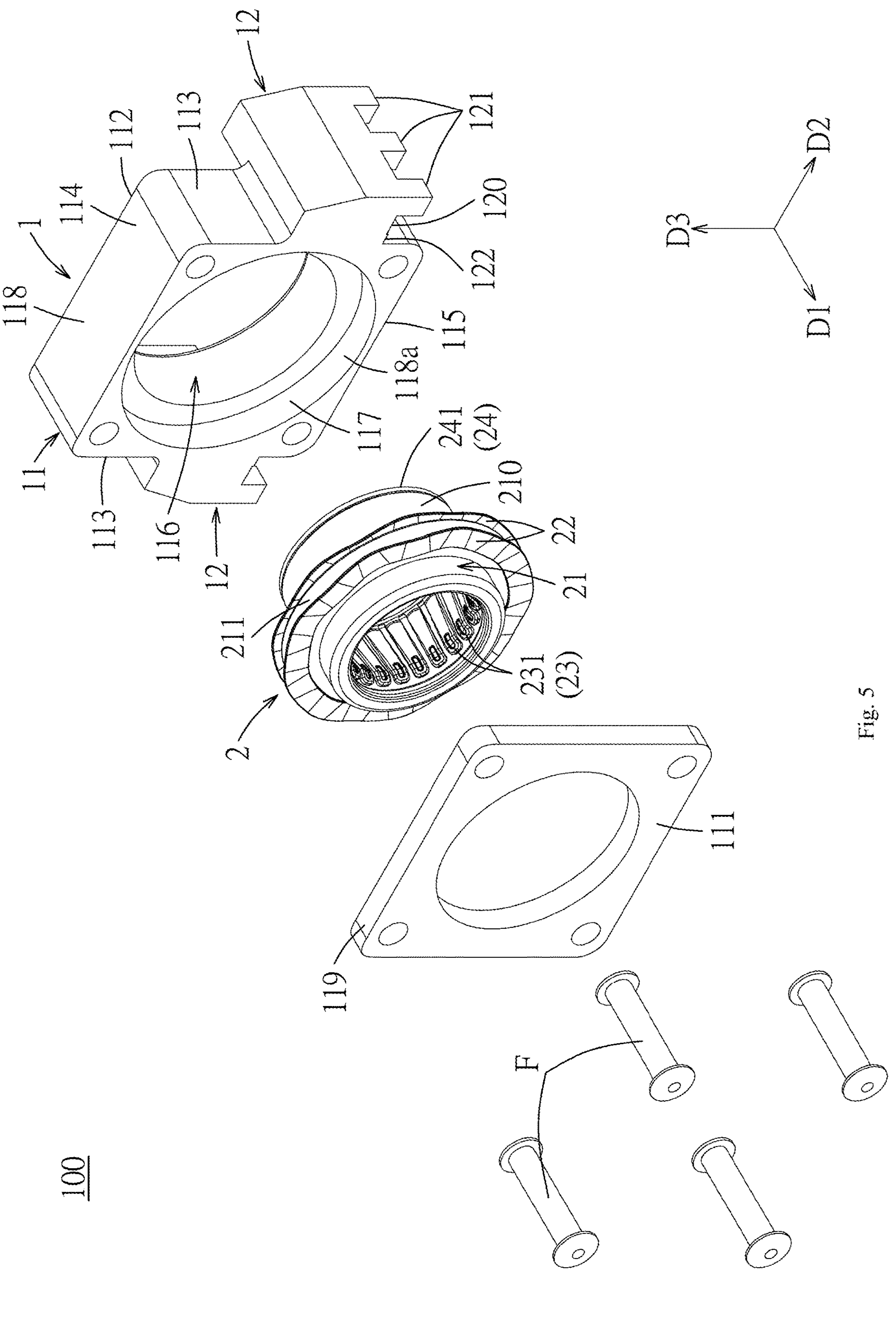
FIG. 5 is a perspective exploded view of the first embodiment.
Figure 6:
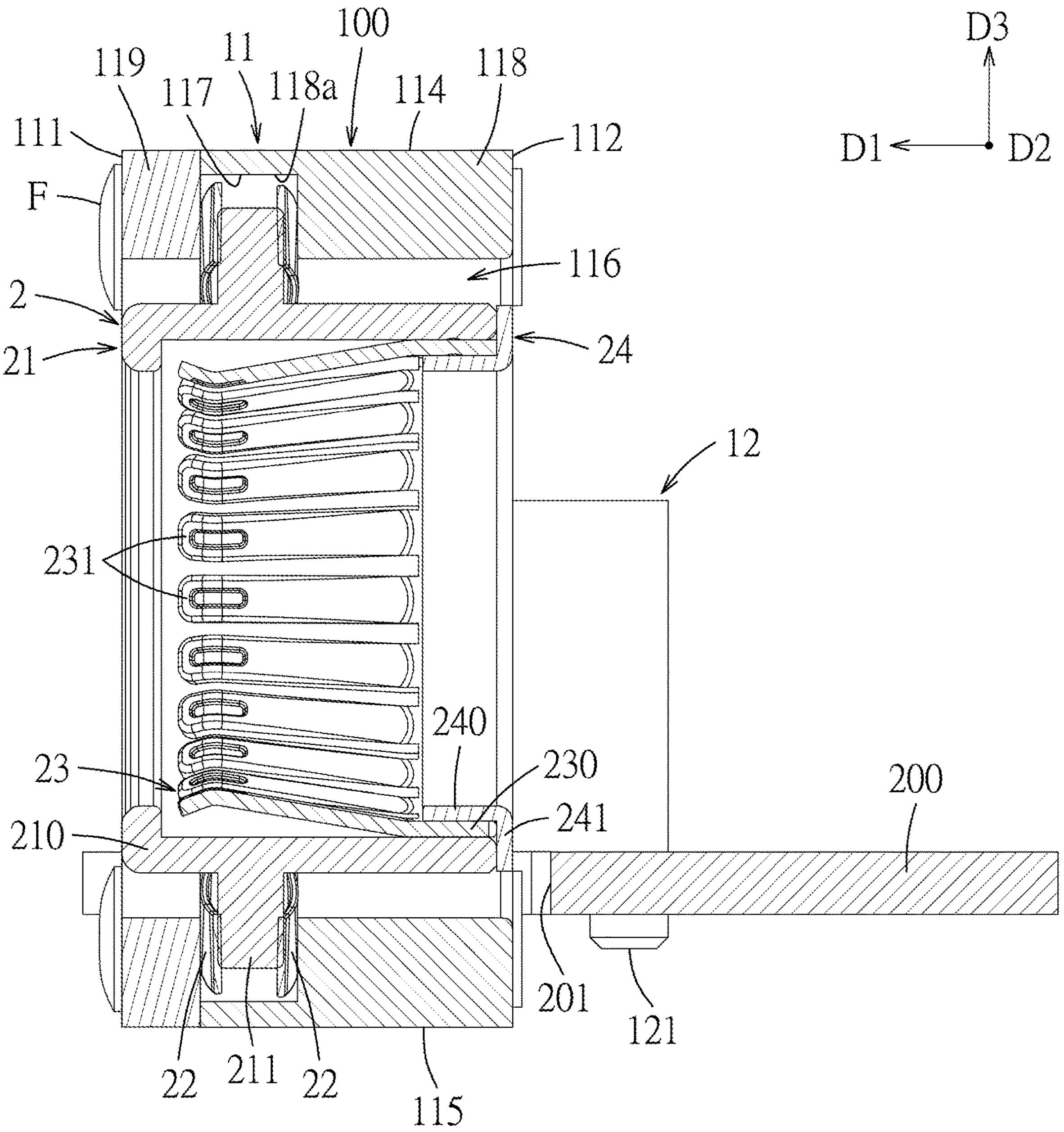
FIG. 6 is a cross sectional view of the first embodiment.
Figure 10:
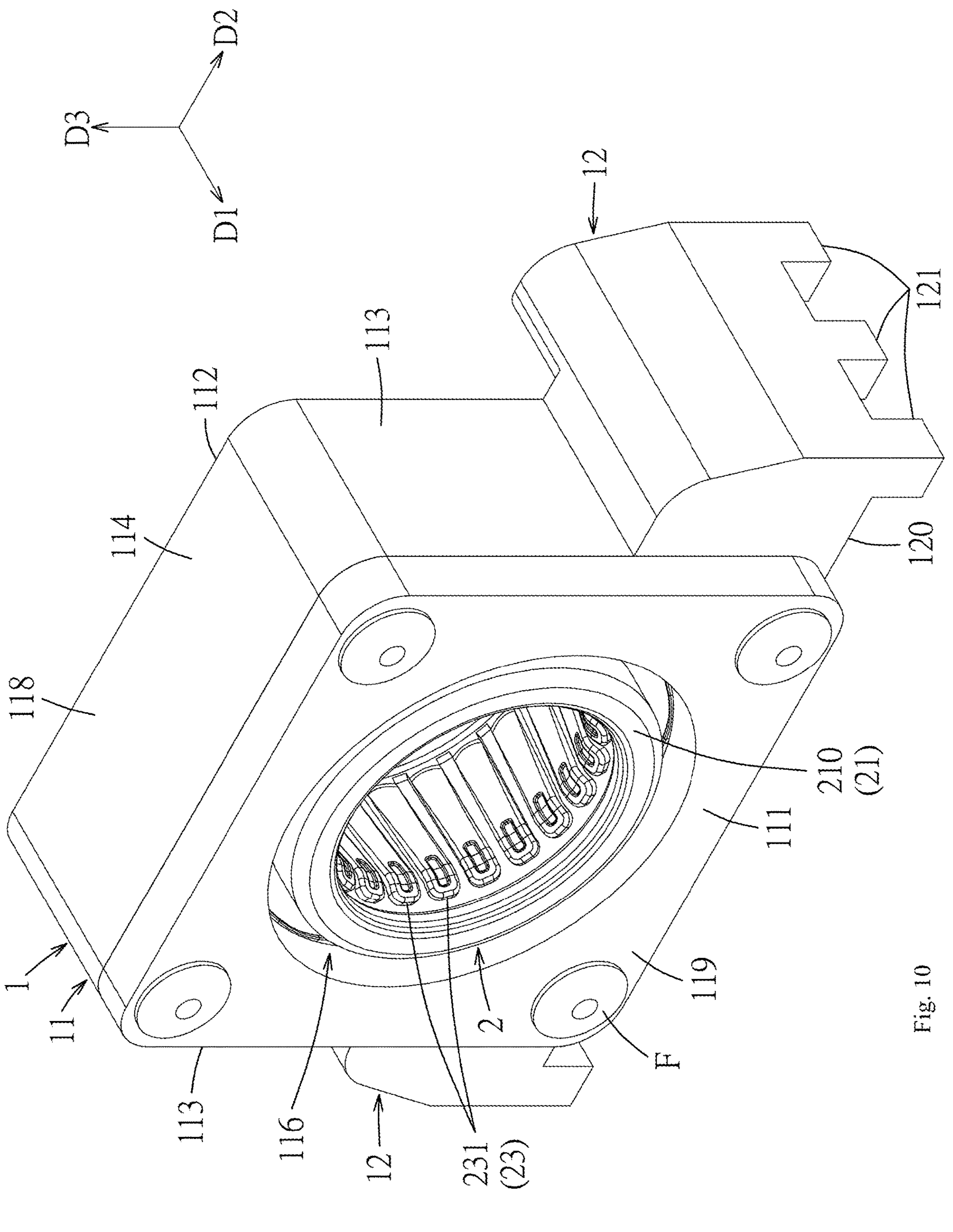
FIG. 10 is a perspective view of a third embodiment of the receptacle of the present disclosure.
Figure 11:
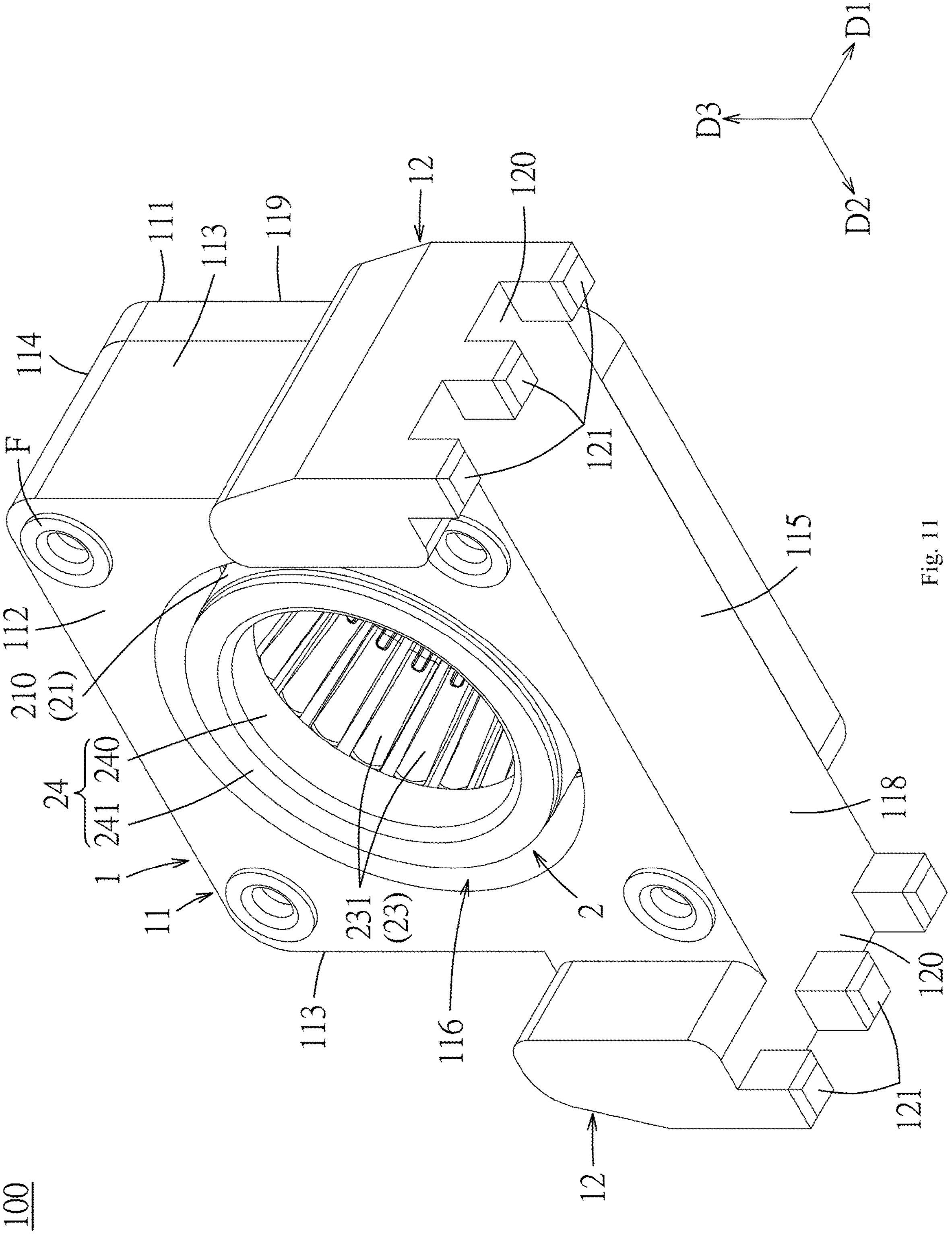
FIG. 11 is a perspective view of the third embodiment of FIG. 10 viewed from another angle.

Referring to FIG. 10 to FIG. 11, a third embodiment of the present disclosure receptacle 100 differs from the first embodiment in that, the two mounting surfaces 120 of the two supporting portions 12 each are not provided with the raising portion 122 as shown in FIG. 4, and are flush with the bottom end 115 of the body portion 11. Specifically, the two mounting surfaces 120 of the two supporting portions 12 are flush with a bottom surface of the rear seat body 118. The third embodiment is adapted to be mounted on board, the circuit board 200 which cooperates with the third embodiment may not have the opening 201 as shown in FIG. 1.

In conclusion, the conductive seat 1 is provided to the circuit board 200 via the two supporting portions 12 which each are positioned at the outer side of the corresponding mounting surface 120, the capability of the conductive seat 1 resisting to a torque generated by a force in the left-right direction subjected by the conductive seat 1 can be strengthened, therefore the assembled strength between the conductive seat 1 and the circuit board 200 can be strengthened.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. A receptacle, comprising:

a conductive seat including a body portion and two supporting portions, the body portion and the two supporting portions being integrally formed, the body portion comprising a front end, a rear end and two side ends extending between the front end and the rear end, the body portion having a passageway extending between the front end and the rear end, and each supporting portion comprising a front end, a rear end, a mounting surface extending between lower ends of the front and rear ends thereof, and a plurality of connecting legs extending downward from the mounting surface, the mounting surfaces extending outwardly from the two side ends of the body portion respectively; and a contact unit provided in the passageway of the body portion.

2. The receptacle of claim 1, wherein the two supporting portions extend rearwardly beyond the rear end of the body portion.

3. The receptacle of claim 1, wherein the body portion further has a top end and a bottom end, and a ventilating duct extending between the top end and the bottom end which is in communication with the passageway.

4. The receptacle of claim 1, wherein the body portion further has a bottom end, the two mounting surfaces of the two supporting portions are higher than the bottom end of the body portion.

5. The receptacle of claim 1, wherein the conductive seat further is formed with an annular receiving groove which extends outwardly from the passageway, the contact unit comprises a barrel-shaped member, a biasing member and a cage-shaped contacting member, the barrel-shaped member has a barrel body whose outer diameter is less than the passageway and an annular flange which extends outwardly from an outer wall surface of the barrel body, the annular flange is movably received in the annular receiving groove, the biasing member has elasticity and is provided between the annular flange of the barrel-shaped member and the annular receiving groove to allow the barrel-shaped member of the contact unit can float in the passageway, and the cage-shaped contacting member is provided in the barrel body of the barrel-shaped member.

6. The receptacle of claim 5, wherein the conductive seat comprises at least two seat bodies which are combined with each other, one seat body of the at least two seat bodies is formed with an annular recessed portion, the annular receiving groove is defined together by the annular recessed portion of the one seat body and another seat body of the at least two seat bodies.

7. The receptacle of claim 5, wherein the contact unit further comprises a fixing ring, the fixing ring and the barrel body of the barrel-shaped member together clamp the cage-shaped contacting member so as to fix the cage-shaped contacting member in the barrel-shaped member.

8. The receptacle of claim 1, wherein each supporting portion further has a raising portion which extends downwardly from the mounting surface.

9. The receptacle of claim 8, wherein in each supporting portion, the plurality of connecting legs are connected to the mounting surface at an outer side of the mounting surface relative to the raising portion, and the raising portion is connected to the mounting surface at an inner side of the mounting surface relative to the plurality of connecting legs.

10. The receptacle of claim 9, wherein each raising portion is a rib which extends forwardly and rearwardly.

11. The receptacle of claim 1, in combination with a circuit board wherein the receptacle is mounted to the circuit board, the circuit board has an opening and two conductive pads and a plurality of conductive holes which are respectively positioned at two sides of the opening, each conductive hole is at least partially overlapped with the corresponding conductive pad, the connecting legs of the receptacle are electrically connected and inserted into the plurality of conductive holes respectively, the two mounting surfaces of the two supporting portions are respectively surface bonded and soldered to the two conductive pads of the circuit board by a solder, and the body portion of the conductive seat of the receptacle is in the opening.

12. The receptacle and circuit board of claim 11, wherein each supporting portion further has a raising portion which extends downwardly from the mounting surface, and the raising portion forms a gap between the mounting surface of the supporting portion and the conductive pad of the circuit board.

13. The receptacle of claim 1, wherein the passageway extends between the front end and the rear end along a front-rear direction, the two supporting portions extend outwardly from the two side ends respectively along a left-right direction which is transverse to the front-rear direction, and the plurality of connecting legs extend downward from the respective mounting surface along an up-down direction which is transverse to the front-rear direction.

14. The receptacle of claim 13, wherein the two supporting portions extend rearwardly beyond the rear end of the body portion.

15. The receptacle of claim 13, wherein the body portion further has a top end and a bottom end, and a ventilating duct extending between the top end and the bottom end which is in communication with the passageway.

16. The receptacle of claim 13, wherein the body portion further has a bottom end, the two mounting surfaces of the two supporting portions are higher than the bottom end of the body portion.

17. The receptacle of claim 13, wherein the conductive seat comprises at least two seat bodies which are affixed to each, one seat body of the at least two seat bodies is formed with an annular recessed portion, the annular receiving groove is defined together by the annular recessed portion of the one seat body and another seat body of the at least two seat bodies.

18. The receptacle of claim 13, wherein each supporting portion further has a raising portion which extends downwardly from the mounting surface, the plurality of connecting legs are connected to the mounting surface at an outer side of the mounting surface relative to the raising portion, and the raising portion is connected to the mounting surface at an inner side of the mounting surface relative to the plurality of connecting legs.

19. The receptacle of claim 18, wherein each raising portion is a rib which extends forwardly and rearwardly.

20. The receptacle of claim 13, in combination with a circuit board wherein the receptacle is mounted to the circuit board, the circuit board has an opening and two conductive pads and a plurality of conductive holes which are respectively positioned at two sides of the opening, each conductive hole is at least partially overlapped with the corresponding conductive pad, the connecting legs of the receptacle are electrically connected and inserted into the plurality of conductive holes respectively, the two mounting surfaces of the two supporting portions are respectively surface bonded and soldered to the two conductive pads of the circuit board by a solder, and the body portion of the conductive seat of the receptacle is in the opening.

* * * * *